(12) United States Patent
Yoon et al.

(10) Patent No.: US 12,263,892 B2
(45) Date of Patent: Apr. 1, 2025

(54) ACTIVE AIR SKIRT APPARATUS FOR MOBILITY

(71) Applicants: Hyundai Motor Company, Seoul (KR); Kia Corporation, Seoul (KR)

(72) Inventors: Jin Young Yoon, Gyeonggi-do (KR); Myung Eun Kim, Gyeonggi-do (KR); Dong Eun Cha, Gyeonggi-do (KR); Hong Heui Lee, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 241 days.

(21) Appl. No.: 17/972,433

(22) Filed: Oct. 24, 2022

(65) Prior Publication Data

US 2023/0339553 A1  Oct. 26, 2023

(30) Foreign Application Priority Data

Apr. 25, 2022  (KR) .......................... 10-2022-0050788

(51) Int. Cl.
*B62D 35/00* (2006.01)
*B62D 35/02* (2006.01)
*B62D 37/02* (2006.01)

(52) U.S. Cl.
CPC ........... *B62D 35/005* (2013.01); *B62D 35/02* (2013.01); *B62D 37/02* (2013.01)

(58) Field of Classification Search
CPC ....... B62D 35/005; B62D 35/02; B62D 37/02
See application file for complete search history.

(56) References Cited

U.S. PATENT DOCUMENTS

| | | | | |
|---|---|---|---|---|
| 2017/0120967 | A1* | 5/2017 | Yoon ..................... | B62D 35/005 |
| 2018/0134331 | A1* | 5/2018 | Yoon ..................... | B62D 35/007 |
| 2018/0134332 | A1* | 5/2018 | Cha ...................... | B62D 35/007 |
| 2018/0154952 | A1* | 6/2018 | Klop ...................... | B62D 37/02 |
| 2018/0290535 | A1* | 10/2018 | McMillan .............. | B60K 11/08 |
| 2020/0130756 | A1* | 4/2020 | Kim ...................... | B62D 25/18 |
| 2022/0332379 | A1* | 10/2022 | Doerr .................... | B62D 35/02 |

FOREIGN PATENT DOCUMENTS

| | | |
|---|---|---|
| KR | 20-1999-0025532 U | 7/1999 |
| KR | 10-2016-0043545 A | 4/2016 |

* cited by examiner

*Primary Examiner* — Dale W Hilgendorf
*Assistant Examiner* — Hana Lee
(74) *Attorney, Agent, or Firm* — Fox Rothschild LLP

(57) ABSTRACT

An active air skirt apparatus for a mobility is configured to control an airflow beneath the mobility according to a driving situation of the mobility to ensure optimal aerodynamic performance in the mobility having a flat lower portion for loading a high-voltage battery. That is, improvement of airflow to the front wheel and rear wheel along with improvement of airflow beneath the mobility in each driving situation optimizes the aerodynamic performance of the mobility, thereby ensuring mileage and improving attitude stability of the mobility.

18 Claims, 7 Drawing Sheets

ACTIVE AIR SKIRT APPARATUS FOR MOBILITY

CROSS REFERENCE TO RELATED APPLICATION

The present application claims the benefit of Korean Patent Application No. 10-2022-0050788, filed Apr. 25, 2022, the entire contents of which is incorporated herein for all purposes by this reference.

FIELD OF THE DISCLOSURE

Embodiments of the present disclosure relate to an active air skirt apparatus for a mobility, and more particularly, to an active air skirt apparatus for a mobility configured to control the airflow beneath the mobility to improve aerodynamic performance in an electric vehicle having a flat lower portion for loading a high-voltage battery.

DESCRIPTION OF THE RELATED ART

When a vehicle drives at high speed, the air in the atmosphere is compressed to generate turbulence, which causes deterioration in the stability and driving performance of the vehicle.

Rear spoilers are recently installed in vehicles to address the issue. The rear spoiler adjusts the airflow in the rear of the vehicle to increase the pressure that helps push the vehicle down to the road surface more stably, thereby improving driving stability and driving performance of the vehicle driving at high speed.

In addition, vehicles are provided with various spoilers for controlling the airflow beneath the vehicles without the rear spoilers.

In addition, technological development for electric vehicles loaded with high-voltage batteries has been underway recently, and electric vehicles are gaining popularity.

In particular, in the case of electric vehicles, the vehicle or mobility has a flat lower portion for loading a high-voltage battery in the lower portion of the vehicle. Accordingly, the airflow beneath the electric vehicle is diverted outward by the low pressure generated by the rotation of the front wheel, and high pressure is generated in the wake of the front wheel and toward the rear wheel so that the aerodynamic performance of the vehicle deteriorates. This phenomenon occurs in an electric vehicle loaded with a high-voltage battery. Technological development for improving the airflow beneath the electric vehicle is desired.

The matters described as a background of the present disclosure are intended only for a better understanding of the background of the present disclosure and are not to be taken as acknowledgment that they pertain to the conventional art already known to those skilled in the art.

SUMMARY

An object of the present disclosure proposed to address the issue described above is to provide an active air skirt apparatus for a vehicle configured to control the airflow beneath the vehicle to improve the aerodynamic performance in an electric mobility having a flat lower portion for loading a high-voltage battery.

In one aspect, an active air skirt apparatus for a is provided, wherein the active air apparatus comprises: (a) a side flap configured to be installed in a vehicle body and positioned to the front of a front wheel or stowed depending on actuation to selectively block airflow to the front wheel; (b) a side drive unit configured to be installed in the vehicle body and connected to the side flap to adjust the position of the side flap according to control; and (c) a control unit configured to control the side drive unit according to a driving state of the vehicle.

In another aspect, the active air skirt apparatus for a vehicle includes a side flap installed in the vehicle body in the lower portion of the vehicle and pulled out, extended or otherwise positioned toward to the front of the front wheel or stowed depending on actuation to selectively block the airflow to the front wheel, a side drive unit installed in the vehicle body and connected to the side flap to adjust the position of the side flap according to control, and a control unit configured to control the side drive unit according to the driving state of the vehicle.

In some embodiments, the vehicle has a flat lower portion.

In some embodiments, the side flap and side drive unit are disposed on each of a pair of front wheels to allow the air to flow between the side flaps.

In some embodiments, the side flap includes a first skirt and a second skirt spaced apart from each other in the front/rear direction in front of the front wheel, and the first skirt and the second skirt partially cover the front of the front wheel.

In some embodiments, the first skirt and the second skirt cover both the inner and outer sides of the front wheel and extend longer to the inner side.

In some embodiments, the first skirt extends downward longer than the second skirt and has a greater total area than the second skirt.

In some embodiments, the side drive unit is provided with a screw rotating during operation, and the first skirt and the second skirt are connected to the screw by a link unit so that the positions of the first skirt and the second skirt are adjusted together during the operation of the side drive unit.

In some embodiments, the first skirt is installed movably in the up/down direction in the vehicle body and is provided with a first connecting rod at the upper end, and the link unit includes a first rod portion extending in the front/rear direction, a first front gear provided at one end of the first rod portion and gear-fastened to the first connecting rod, and a first rear gear provided at the other end of the first rod portion and gear-fastened to the screw.

In some embodiments, the second skirt is spaced apart from the first skirt, installed movably in the up/down direction, and provided with a second connecting rod at the upper end, and the link unit includes a second rod portion extending in the front/rear direction, a second front gear provided at one end of the second rod portion and gear-fastened to the screw, and a second rear gear provided at the other end of the second rod portion and gear-fastened to the second connecting rod.

In some embodiments, a center flap provided between the side flaps and pulled out or stowed beneath the mobility depending on actuation to selectively block the airflow and a center drive unit connected to the center flap to adjust the position of the center flap according to the control of the control unit are further included in the lower portion of the mobility.

In some embodiments, the center flap is installed movably in the up/down direction in the vehicle body, and a plurality of center drive units are provided to be respectively connected to either end of the center flap.

In some embodiments, the center flap includes a connecting portion extending obliquely and is connected to the center drive unit by a multi-joint link, and the multi-joint link includes a plate coupled to the vehicle body, an actuating link having one end connected to one side of the plate and the other end connected to one side of the connecting portion and extending linearly, and a support link having one end connected to the other side of the plate and the other end connected to the other side of the connecting portion and extend curvilinearly.

In some embodiments, a low-speed driving mode, a fuel economy driving mode, and a high-speed driving mode are preset in the control unit according to the driving state of the vehicle and the control unit controls the positions of the side flaps and the center flap in each mode.

In some embodiments, the control unit controls the side drive unit and the center drive unit such that both the side flaps and the center flap are stowed in the low-speed driving mode.

In some embodiments, the control unit controls the side drive unit and the center drive unit such that the side flap is pulled out and the center flap is stowed in the fuel economy driving mode.

In some embodiments, the control unit controls the side drive unit and the center drive unit such that both the side flap and the center flap are pulled out in the high-speed driving mode.

In some embodiments, the active air skirt apparatus for the vehicle having the configuration as described above controls the airflow beneath the vehicle according to the driving state of the vehicle to ensure the optimal aerodynamic performance in the vehicle having a flat lower portion for loading a high-voltage battery. That is, improvement of the airflow to the front wheel and the rear wheel along with the improvement of the airflow beneath the vehicle in each driving mode optimizes the aerodynamic performance of the vehicle, thereby ensuring mileage and improving attitude stability of the vehicle.

As discussed, the method and system suitably include use of a controller or processer. In another embodiment, vehicles are provided that comprise an apparatus as disclosed herein. For instance, in one aspect, a vehicle provided that comprises an active air skirt apparatus, wherein the active air skirt apparatus comprises (a) a side flap configured in the vehicle body in a lower portion of the vehicle and pulled out, extended or otherwise positioned to the front of a front wheel or stowed depending on actuation to selectively block airflow to the front wheel; (b) a side drive unit installed in the vehicle body and connected to the side flap to adjust the position of the side flap according to control; and (c) a control unit configured to control the side drive unit according to a driving state of the vehicle.

DETAILED DESCRIPTION OF THE DISCLOSURE

Figure 1:
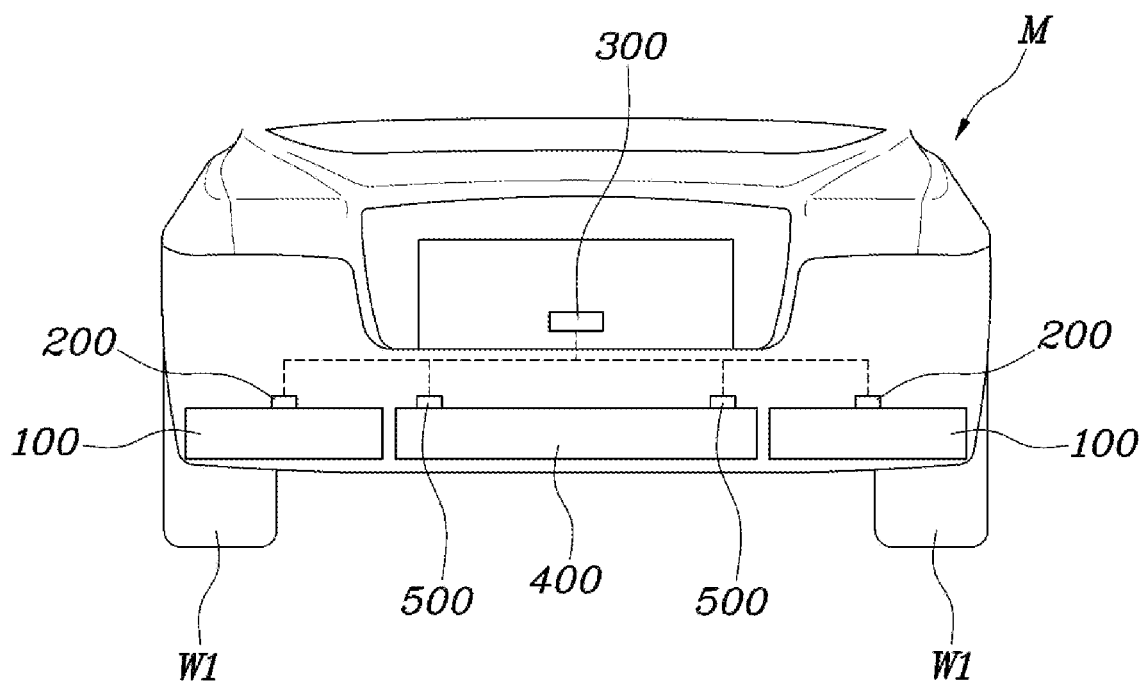
FIG. 1 is a view illustrating an active air skirt apparatus for a vehicle according to the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

An active air skirt apparatus for mobility according to a preferred embodiment of the present disclosure will be described with reference to the accompanying drawings in the following.

The specific structural or functional descriptions of the embodiments disclosed in the present specification or application are merely exemplified for the purpose of describing the embodiments according to the present disclosure. The embodiments of the present disclosure may be implemented in various forms, and the present disclosure is not to be interpreted as being limited to the embodiments described in the present specification or application.

The embodiment according to the present disclosure may be subject to various modifications and have various forms so that specific embodiments will be illustrated in the drawings and described in detail in the present specification or application. It is to be understood that this is not intended to limit the embodiments according to the concept of the present disclosure to the specific disclosed forms and that all modifications, equivalents, and substitutes within the spirit and technical scope of the present disclosure are included.

Unless otherwise defined, all terms used herein, including technical or scientific terms, may have the same meanings as are generally understood by those skilled in the art to which the present disclosure pertains. The terms such as those defined in commonly used dictionaries are to be interpreted as having meanings consistent with their meanings in the context of the related technology and are not to be interpreted in an idealized or overly formal sense unless expressly so defined herein.

The present disclosure is described in detail in the following by describing preferred embodiments of the present disclosure with reference to the drawings. The same reference numerals presented in each drawing refer to the same members.

Figure 2:
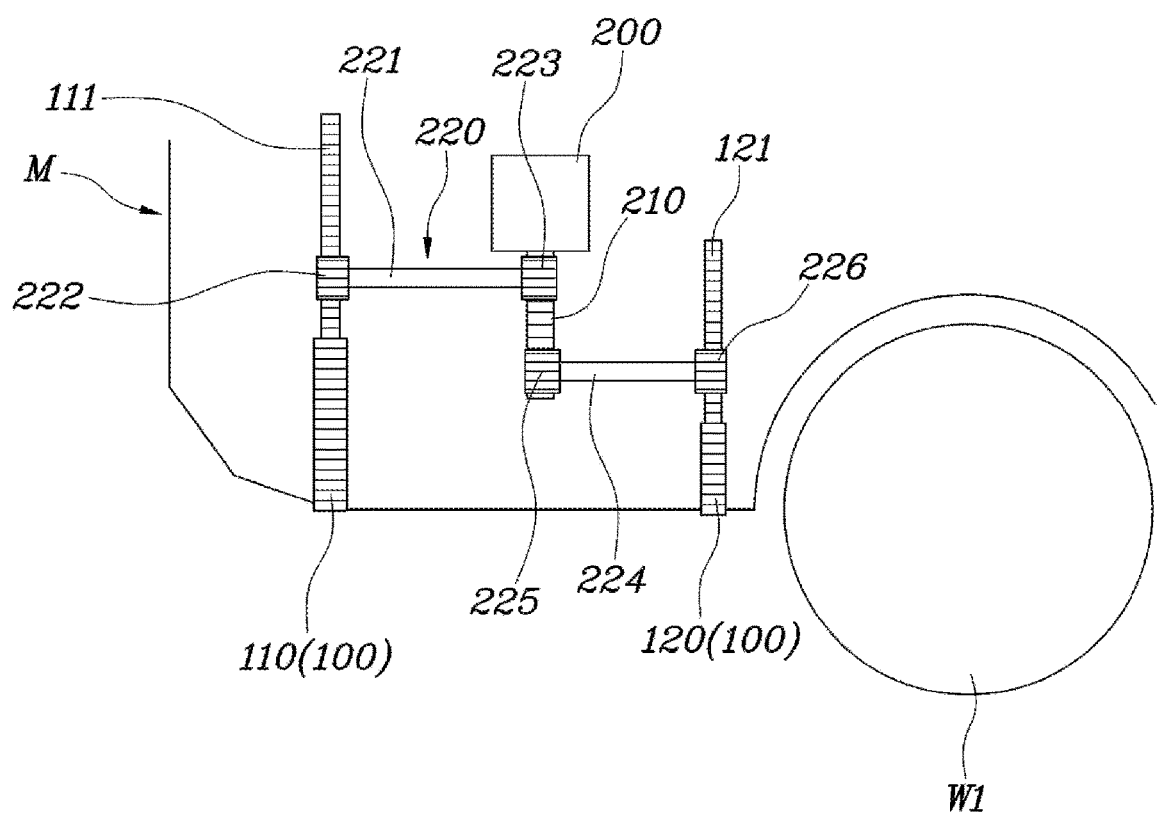
FIG. 2 is a view illustrating a pre-actuation state of a side flap and a center flap of the active air skirt apparatus for a vehicle illustrated in FIG. 1.
Figure 3:
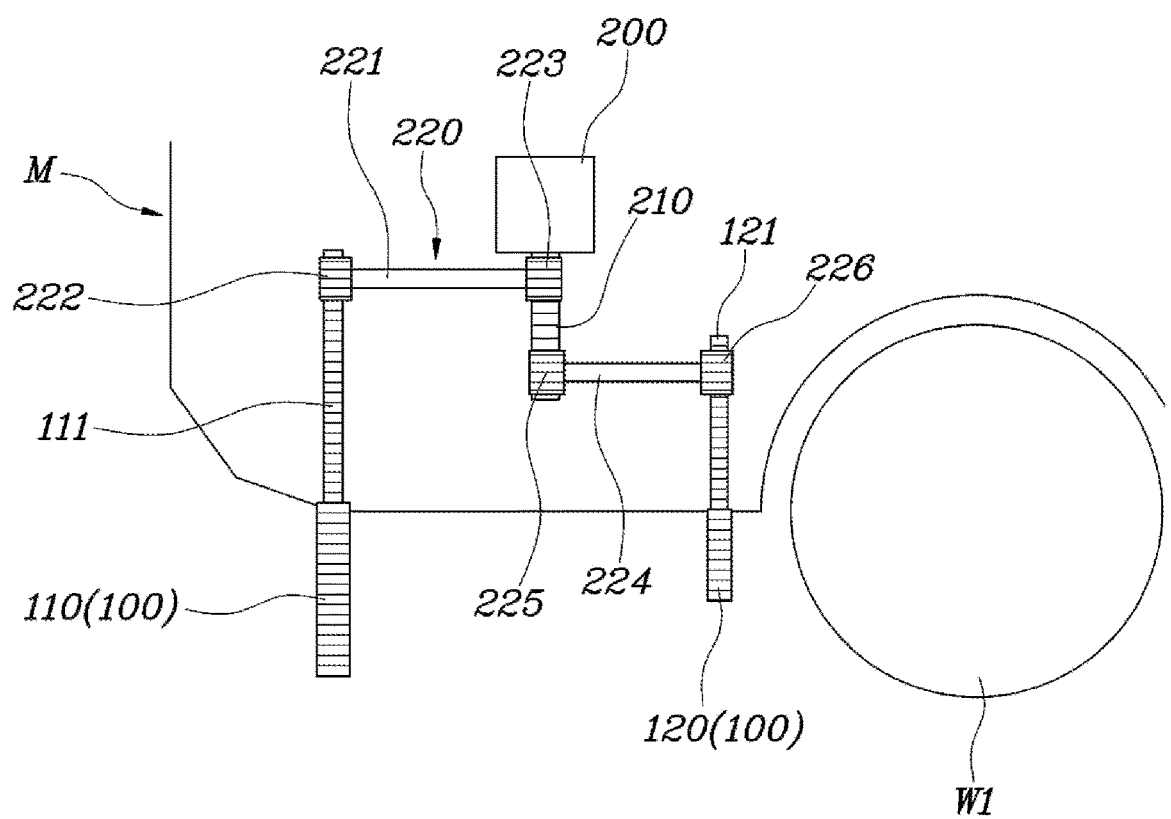
FIG. 3 is a view illustrating a post-actuation state of a side flap and a center flap of the active air skirt apparatus for a vehicle illustrated in FIG. 1.

According to the present disclosure, as illustrated in FIGS. 1 to 3, an active air skirt apparatus for a vehicle (mobility) may include a side flap 100 installed in a vehicle body in a lower portion of the mobility M and pulled out to the front of the front wheel W1 or stowed depending on actuation to selectively block the airflow to the front wheel W1, a side drive unit 200 installed in the vehicle body and connected to the side flap 100 to adjust the position of the side flap 100 according to control, and a control unit 300 controlling the side drive unit 200 according to the driving state of the mobility.

The present disclosure aims to control the airflow beneath the mobility M to improve the aerodynamic performance, and the side flap 100 and the side drive unit 200 are installed in front of a front wheel W1.

Here the mobility M may be an electric mobility M having a flat lower portion. That is, in the case of an electric vehicle or mobility M, the mobility M has a flat lower portion with a high-voltage battery case for loading a high-voltage battery in the lower portion of the mobility. In addition, a motor is connected to each wheel of the vehicle or mobility M so that each wheel is controlled by the operation of the motor. Accordingly, electric mobility M is free of components such as hydraulic lines, propeller shafts, fuel tank, and the like present in the internal combustion engine vehicle and has a relatively flat lower portion.

The electric mobility M may have a flat lower portion such that the airflow beneath the vehicle or mobility M during driving is different from other conventional vehicles. That is, the airflow beneath the vehicle or mobility M is smooth but is diverted outward by the low pressure around the front wheel W1 generated by the rotation of the front wheel W1, and the air, along with the wake behind the front wheel W1, flows toward the rear wheel to generate high pressure. According to an embodiment of the present disclosure, the side flap 100 is disposed in front of the front wheel W1 so that air flows to the rear of the front wheel W1, and then, to the outer side of the rear wheel. Accordingly, the airflow in the rear of the front wheel W1 becomes smooth in connection with the wake behind the rear wheel, thereby improving the aerodynamic performance according to the airflow beneath the mobility M.

According to an embodiment of the present disclosure, the side flap 100 may be pulled out or stowed by the side drive unit 200 operated by the control of the control unit 300. The side flap 100 may be installed on the bumper side of the vehicle or mobility M and is withdrawn from the front of the front wheel W1 during stowage and disposed in front of the front wheel W1 during pulling-out to block the airflow.

In addition, the side flaps 100 and the side drive units 200 may be disposed on each of the pair of the front wheels W1 to allow the air to flow between side flaps 100. Disposing the side flap 100 and the side drive unit 200 in front of each front wheel W1 improves the airflow by the front wheel W1, and the flat lower portion of the electric mobility M ensures improved aerodynamic performance.

As illustrated in FIGS. 2 to 5, the side flap 100 may include a first skirt 110 and a second skirt 120 spaced apart from each other in the front/rear direction in front of the front wheel W1, and the first skirt 110 and the second skirt 120 may partially cover a front of the front wheel W1.

The side flap 100 may include the first skirt 110 and the second skirt 120 such that the vehicle-induced wind is blocked by the first skirt 110 and the second skirt 120 when the vehicle or mobility M drives. That is, the airflow beneath the vehicle or mobility M is first blocked by the first skirt 110 such that the airflow to the rear of the front wheel W1 is blocked so that the air resistance of the front wheel W1 is reduced when the vehicle or mobility M drives. In addition, some air that passes through the first skirt 110 is blocked by the second skirt 120 again so that the airflow does not interfere with the front wheel W1 and smooth airflow is generated, thereby improving the drag.

The first skirt 110 and the second skirt 120 may cover both the inner and outer sides of the front wheel W1 and extend longer to the inner side. That is, the flow of the vehicle-induced wind in front of the vehicle or mobility M is guided by the first skirt 110 and the second skirt 120 such that the airflow to the outer side of the front wheel W1 is improved. However, the air flowing beneath the vehicle or mobility M may interfere with the front wheel W1 caused by the low pressure generated by the rotation of the front wheel W1, and the longer extension of the first skirt 110 and the second skirt 120 to the inner side helps the vehicle-induced wind avoid the interference with the front wheel W1, thereby generating a smooth airflow.

On the other hand, the first skirt 110 may extend downward longer than the second skirt 120 and may have a greater total area than the second skirt 120. That is, the first skirt 110 has a greater total area than the second skirt 120 for blocking the airflow first. If the second skirt 120 has a greater total area than the first skirt 110, the blocking efficiency of the air flowing to the front wheel W1 through the first skirt 110 and the second skirt 120 deteriorates and the exposed overlapping structure of the first skirt 110 and the second skirt 120 compromises stylish attractiveness. Accordingly, the first skirt 110 is formed in a bigger shape than the second skirt 120.

On the other hand, according to an embodiment of the present disclosure, the side drive unit 200 may be provided with a screw 210 rotating during operation, and the first skirt 110 and the second skirt 120 may be connected to the screw 210 by a link unit 220 so that the positions of the first skirt 110 and the second skirt 120 are adjusted together during the operation of the side drive unit 200.

Figure 4:
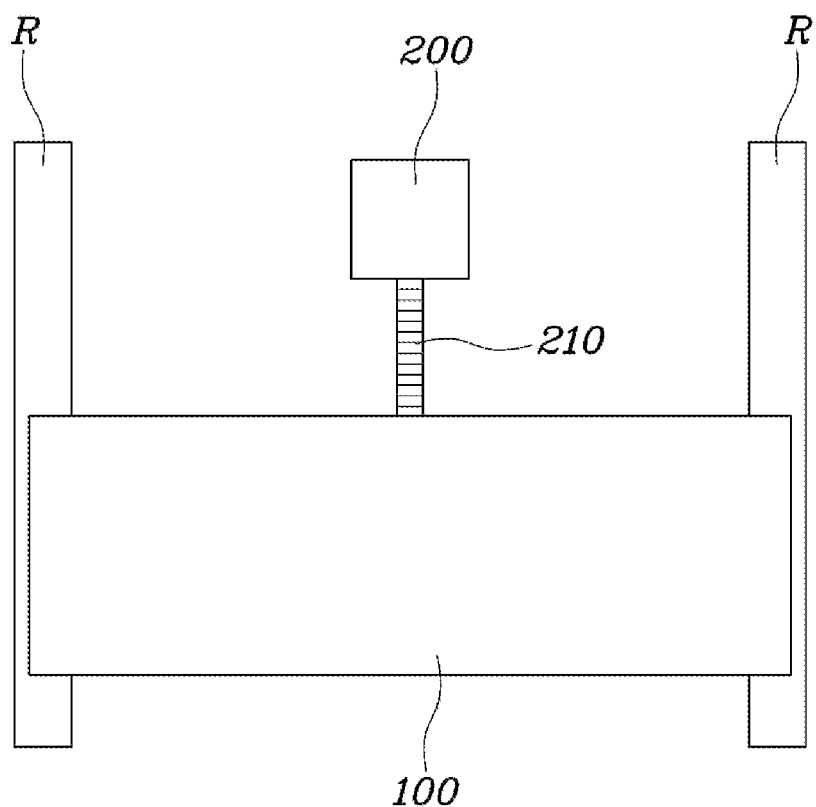
FIG. 4 is a view illustrating a connection between a side flap and a side drive unit according to the present disclosure.

As illustrated in FIGS. 2 to 4, the link unit 220 may rotate or linearly move in association with the rotation of the screw 210 as the screw 210 rotates during the operation of the side drive unit 200 so that the first skirt 110 and the second skirt 120 connected to the link unit 220 move simultaneously to adjust positions.

More specifically, the first skirt 110 may be installed movably in the up/down direction in the vehicle body and provided with a first connecting rod 111 at the upper end, and the link unit 220 may include a first rod portion 221 extending in the front/rear direction, a first front gear 222 provided at one end of the first rod portion 221 and gear-fastened to a first connecting rod 111, and a first rear gear 223 provided at the other end of the first rod portion 221 and gear-fastened to the screw 210.

Here, the first skirt 110 may be installed movably in the up/down direction and provided with the first connecting rod 111 at the upper end, and the first connecting rod 111 may be threaded on the outer circumferential surface.

In addition, the link unit 220 for moving the first skirt 110 may include the first rod portion 221, the first front gear 222, and the first rear gear 223. That is, the first front gear 222 of the first rod portion 221 is gear-engaged with the first connecting rod 111 and the first rear gear 223 is gear-engaged with the screw 210 such that the first rod portion 221 rotates together with the first rear gear 223 when the screw 210 rotates as the side drive unit 200 is operated and the first connecting rod 111 connected to the first front gear 222 linearly moves to adjust the position of the first skirt 110. The operation may be structured in the rack and pinion system but is not limited thereto. Various connecting structures may be adopted.

Here, the vehicle or mobility M may further include a guide rail R guiding the first skirt 110 into an up/down linear motion, and connecting the first skirt 110 to the guide rail R may secure the bearing capacity against the vehicle-induced wind.

On the other hand, the second skirt 120 may be spaced apart from the first skirt 110, installed movably in the up/down direction, and provided with a second connecting rod 121 at the upper end. The link unit 220 includes a second rod portion 224 extending in the front/rear direction, a second front gear 225 provided at one end of the second rod portion 224 and gear-fastened to the screw 210, and a second rear gear 226 provided at the other end of the second rod portion 224 and gear-fastened to the second connecting rod 121.

Here, the second skirt 120 may be installed movably in the up/down direction on the bumper side, and provided with the second connecting rod 121 and the second connecting rod 121 may be threaded on the outer circumferential surface.

In addition, the link unit 220 for moving the second skirt 120 may include the second rod portion 224, the second front gear 225, and the second rear gear 226. That is, the second front gear 225 of the second rod portion 224 is gear-fastened to the screw 210 and the second rear gear 226 is gear-engaged with the second connecting rod 121 such that the second rod portion 224 rotates together with the second front gear 225 when the screw 210 rotates as the side drive unit 200 is operated and the second connecting rod 121 connected to the second rear gear 226 linearly moves to adjust the position of the second skirt 120. Here, the vehicle or mobility may further include a guide rail R guiding the second skirt 120 into an up/down linear motion, and the bearing capacity against the vehicle-induced wind may be secured by connecting the second skirt 120 to the guide rail R.

According to the present disclosure, the positions of the first skirt 110 and the second skirt 120 may be adjusted depending on whether the side drive unit 200 operates so that the airflow may be adjusted.

On the other hand, as illustrated in FIG. 1, a center flap 400 installed between the side flaps 100 and pulled out or stowed beneath the mobility depending on actuation to selectively block the airflow and a center drive portion 500 connected to the center flap 400 to adjust the position of the center flap 400 according to the control of the control unit 300 may be further included in the lower portion of the vehicle or mobility M.

The center flap 400 may block the airflow beneath the mobility between the side flaps 100. The position of the center flap 400 may be adjusted to the lower side of the vehicle or mobility M by the center drive unit 500 to selectively block the airflow beneath the vehicle or mobility M.

According to an embodiment of the center flap 400 and the center drive unit 500, the center flap 400 may be installed movably in the up/down direction in the vehicle and a plurality of center drive units 500 may be respectively connected to either end of the center flap 400.

Figure 5:
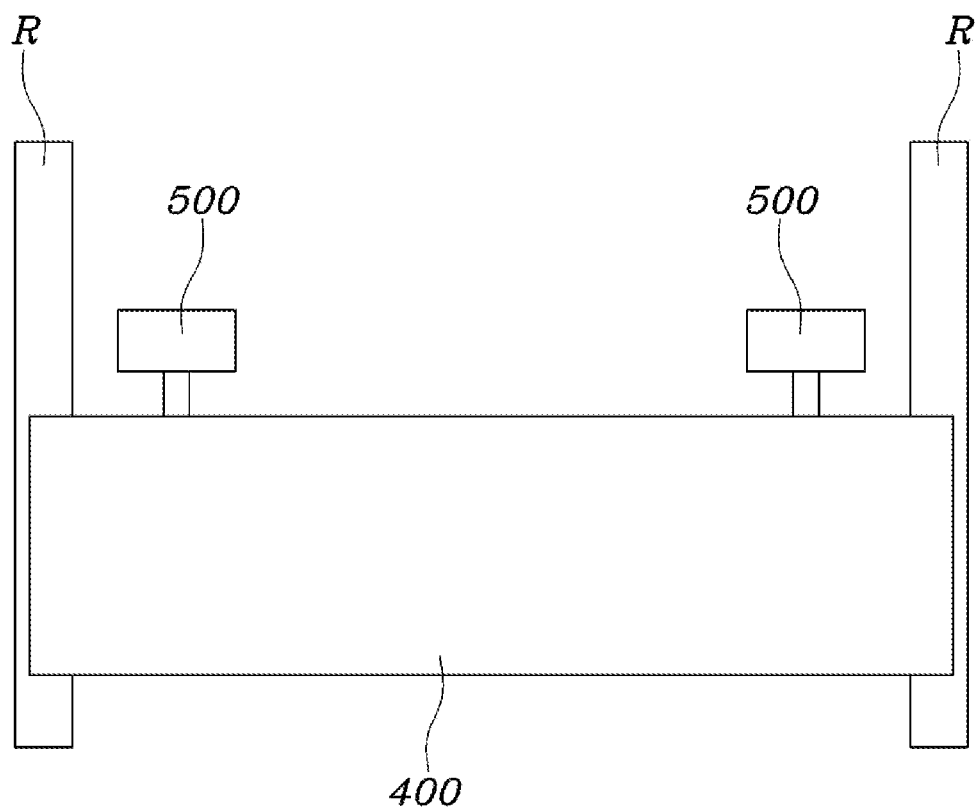
FIG. 5 is a view illustrating a center flap and a center drive unit according to an embodiment of the present disclosure.

As illustrated in FIG. 5, the center flap 400 may be installed on the bumper side in the vehicle body and is installed movably in the up/down direction. The center flap 400 may be guided into an up/down linear motion by a rail structure provided in the vehicle body.

In addition, the center drive unit 500 may include a plurality of linear actuators respectively installed on either end of the center flap 400 to ensure the operability of the center drive unit 500. Of course, the number of center drive units 500 may be set to only one or more, but it is preferable to provide the center drive units 500 on either end of the center flap 400 in consideration of the operation stability and the vehicle-induced wind acting on the center flap 400.

Figure 6:
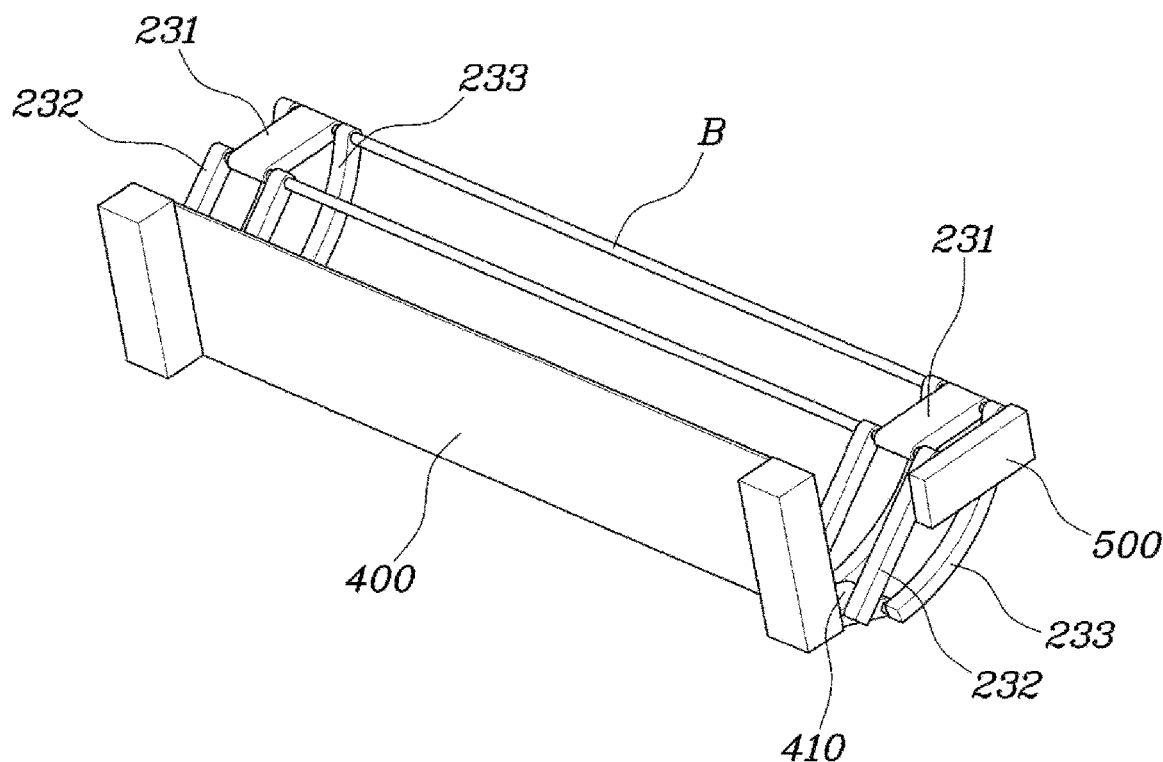
FIG. 6 is a view illustrating a center flap and a center drive unit according to another embodiment of the present disclosure.
Figure 7:
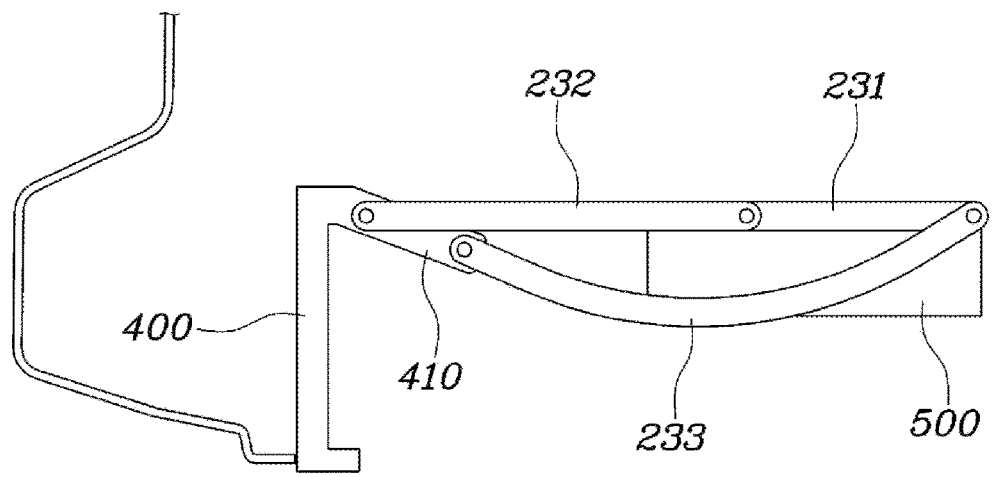
FIG. 7 is a view illustrating a pre-actuation state of the center flap and the center drive unit illustrated in FIG. 6.
Figure 8:
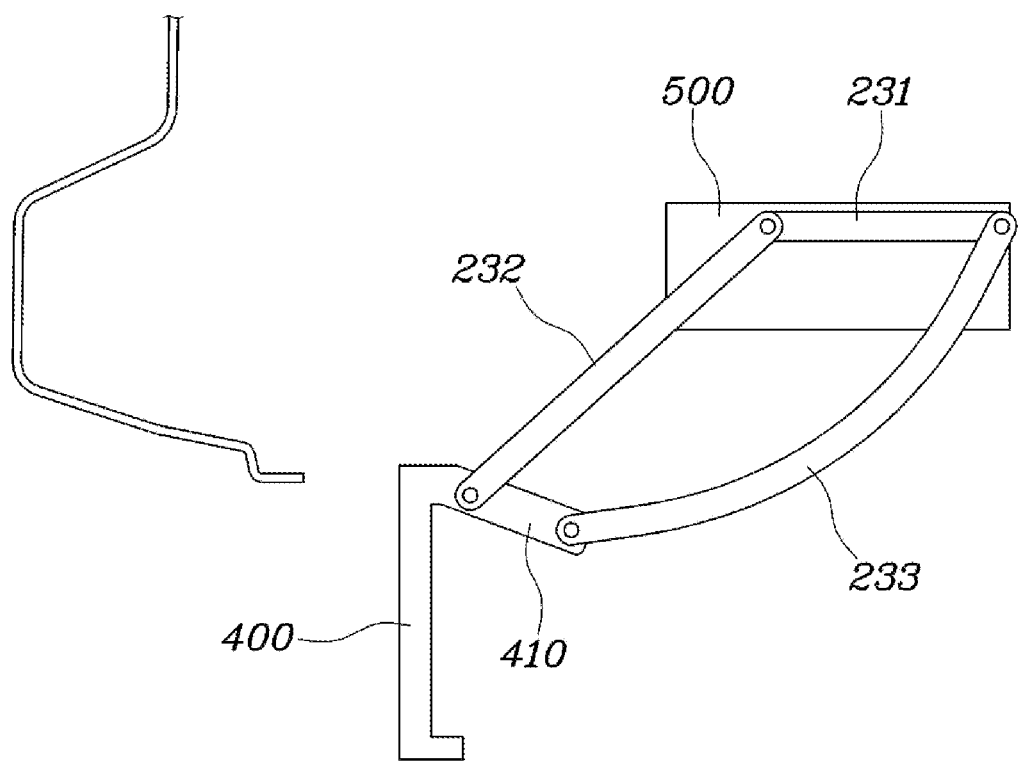
FIG. 8 is a view illustrating a post-actuation state of the center flap and the center drive unit illustrated in FIG. 6

According to another embodiment, as illustrated in FIGS. 6 to 8, the center flap 400 may include a connecting portion 410 extending obliquely and be connected to the center drive unit 500 by a multi-joint link, and the multi-joint link may include a plate 231 coupled to the vehicle body, an actuating link 232 having one end connected to one side of the plate 231 and the other end connected to one side of the connecting portion 410 and extending linearly, and a support link 233 having one end connected to the other side of the plate 231 and another end connected to the other side of the connecting portion 410 and extend curvilinearly. Here, when the links are provided on either side of the center flap 400, the respective multi-joint links are connected to each other by a hinge bar B to ensure operability and structural rigidity.

That is, the center flap 400 may include a connecting portion 410 extending downward obliquely to the rear at the upper or lower end. The connecting portion 410 serves to reduce the rotational play when the actuating link 232 and the support link 233 provided in the center drive unit 500 rotate, and the downward oblique formation helps ensure operability of the actuating link 232 and the support link 233.

A multi-joint link may include a plate 231, the actuating link 232, and the support link 233. Here, the plate 231 is installed in the vehicle body and may be installed together with the center drive unit 500. The actuating link 232 and the support link 233 are rotatably installed on the plate 231, and the actuating link 232 is connected to the center drive unit 500 and rotates when the center drive unit 500 rotates. That is, the center flap 400 moves along with the connecting portion 410 as the actuating link 232 rotates during the operation of the center drive unit 500, thereby adjusting the position of the center flap 400. In addition, the support link 233 is further connected to the other side of the plate 231 and the center flap 400 such that the support link 233 supports the center flap 400 as the rotation position is switched in connection with the rotation motion of the actuating link 232 and the operability is ensured. In addition, the support link 233 extends curvilinearly such as to support the center flap 400 when the center flap 400 moves downward so that the bearing capacity against the vehicle-induced wind acting on the center flap 400 is ensured. Accordingly, the rotation may be restricted when the support link 233 rotates by a certain angle.

The center flap 400 may be connected to the center drive unit 500 by the multi-joint link in this manner, the position of the center flap 400 may be adjusted depending on whether the center drive unit 500 operates, and the support rigidity may be ensured by the connecting structure of the multi-joint link.

On the other hand, the low-speed driving mode, fuel economy driving mode, and high-speed driving mode may be preset in the control unit 300 according to the driving state of the mobility M, and the control unit 300 may control the positions of the side flaps 100 and the center flap 400 in each mode.

The control unit 300 may select the driving mode according to the driving speed of the mobility M and control the positions of the side flap 100 and the center flap 400 in each driving mode, thereby ensuring the optimized aerodynamic performance in the driving state of the mobility M.

Specifically, the control unit 300 may control the side drive unit 200 and the center drive unit 500 such that both the side flap 100 and the center 400 are stowed in the low-speed driving mode.

That is, when the mobility M drives at a low speed, the control unit 300 may determine the driving mode to be the low-speed driving mode and stow both the side flap 100 and the center flap 400 in the low-speed driving mode. That is, when the vehicle or mobility M drives at a low speed, the aerodynamic performance is hardly noticeable with the almost non-existent effect of the vehicle-induced wind, and when the side flap 100 and the center flap 400 are pulled out, interference may occur caused by an obstacle such as a bump.

Accordingly, the control unit 300 may ensure that both the side flap 100 and the center flap 400 may be stowed in the low-speed driving mode.

The control unit 300 may control the side drive unit 200 and the center drive unit 500 such that the side flap 100 is pulled out and the center flap 400 is stowed.

Here, the driver may select the fuel economy driving mode in person, and the control unit 300 pulls out the side flap 100 and stows the center flap 400 when the fuel economy driving mode is selected. Consequently, the airflow to the front wheel W1 side is blocked, and the air flows to the rear of the front wheel W1 and to the outer side of the rear wheel in the mobility having a flat lower portion. Accordingly, the airflow behind the front wheel W1 is smoothed in connection with the wake of the rear wheel, thereby improving the aerodynamic performance according to the airflow beneath the mobility M and improving the fuel efficiency of the vehicle or mobility M.

On the other hand, the control unit 300 may control the side drive unit 200 and the center drive unit 500 such that both the side flap 100 and the center flap 400 are pulled out in the high-speed driving mode.

That is, when the mobility M drives at high speed equal to or greater than a certain speed, both the side flap 100 and the center flap 400 may be pulled out so that the airflow beneath the mobility is minimized. Accordingly, the airflow beneath the vehicle or mobility M is blocked when the mobility M drives at high speed, thereby ensuring driving stability of the vehicle or mobility M.

The active air skirt apparatus for the vehicle or mobility having the configuration as described above may control the airflow beneath the vehicle or mobility according to the driving state of the mobility to ensure the optimal aerodynamic performance in the mobility having a flat lower portion for loading a high-voltage battery. That is, the improvement of the airflow to the front wheel and rear wheel along with the improvement of the airflow beneath the mobility in each driving situation optimizes the aerodynamic performance of the mobility, thereby ensuring mileage and improving attitude stability of the mobility.

As described above, specific embodiments of the present disclosure are illustrated and described, but it will be obvious to those skilled in the art that the present disclosure may be improved upon and modified in various manners without deviating from the technical spirit of the present disclosure provided in the following claims.

What is claimed is:

1. An active air skirt apparatus for a mobility, comprising:
    a side flap configured to be installed in a mobility body and positioned to the front of a front wheel or stowed depending on actuation to selectively block airflow to the front wheel;
    a side drive unit configured to be installed in the mobility body and connected to the side flap to adjust the position of the side flap according to control; and
    a control unit configured to control the side drive unit according to a driving state of the mobility,
    wherein the side flap includes a first skirt and a second skirt spaced apart from each other in a front/rear direction in front of the front wheel,
    wherein the side drive unit is provided with a screw rotating during operation, and
    wherein the first skirt and the second skirt are linked to the screw by a link unit so that positions of the first skirt and the second skirt are adjusted together during an operation of the side drive unit.

2. The active air skirt apparatus of claim 1, wherein the mobility has a flat lower portion.

3. The active air skirt apparatus of claim 1, wherein the side flap and the side drive unit are disposed on each of a pair of front wheels to allow air to flow between the side flaps.

4. The active air skirt apparatus of claim 1, wherein the first skirt and the second skirt partially cover a front of the front wheel.

5. The active air skirt apparatus of claim 4, wherein the first skirt and the second skirt cover both inner and outer sides of the front wheel and extend longer to the inner side.

6. The active air skirt apparatus of claim 4, wherein the first skirt extends downward longer than the second skirt and has a greater total area than the second skirt.

7. The active air skirt apparatus of claim 1, wherein the first skirt is installed movably in an up/down direction in the mobility body and provided with a first connecting rod at an upper end.

8. The active air skirt apparatus of claim 1, wherein the link unit includes a first rod portion extending in the front/rear direction, a first front gear provided at one end of the first rod portion and gear-fastened to the first connecting rod, and a first rear gear provided at the other end of the first rod portion and gear-fastened to the screw.

9. The active air skirt apparatus of claim 1, wherein the second skirt is spaced apart from the first skirt, installed movably in an up/down direction, and provided with a second connecting rod at an upper end.

10. The active skirt apparatus of claim 9, wherein the link unit includes a second rod portion extending in the front/rear direction, a second front gear provided at one end of the second rod portion and gear-fastened to the screw, and a second rear gear provided at the other end of the second rod portion and gear-fastened to the second connecting rod.

11. The active air skirt apparatus of claim 1, further comprising:
   a center flap installed between the side flaps in the lower portion of the mobility, pulled out or stowed in the lower portion of the mobility depending on actuation to selectively block the airflow; and
   a center drive unit connected to the center flap to adjust the position of the center flap according to a control of the control unit.

12. The active air skirt apparatus of claim 11, wherein:
the center flap is installed movably in an up/down direction in the mobility body, and
a plurality of center drive units is provided to be respectively connected to either end of the center flap.

13. The active air skirt apparatus of claim 11, wherein:
the center flap includes a connecting portion extending obliquely and is connected to the center drive unit by a multi-joint link, and
the multi-joint link includes a plate coupled to the mobility body, an actuating link having one end connected to one side of the plate and the other end connected to one side of the connecting portion and extending linearly, and a support link having one end connected to the other side of the plate and the other end connected to the other side of the connecting portion and extend curvilinearly.

14. The active air skirt apparatus of claim 11, wherein a low-speed driving mode, a fuel economy driving mode, and a high-speed driving mode are preset in the control unit according to driving states of the mobility and the control unit controls positions of the side flaps and center flap in each mode.

15. The active air skirt apparatus of claim 14, wherein the control unit controls the side drive unit and the center drive unit such that both the side flap and the center flap are stowed in the low-speed driving mode.

16. The active air skirt apparatus of claim 14, wherein the control unit controls the side drive unit and the center drive unit such that the side flap is pulled out and the center flap is stowed in the fuel economy mode.

17. The active air skirt apparatus of claim 14, wherein the control unit controls the side drive unit and the center drive unit such that both the side flap and the center flap are pulled out in the high-speed driving mode.

18. A vehicle comprising the active air skirt apparatus of claim 1.

* * * * *